United States Patent [19]

Wynne

[11] 4,383,828
[45] May 17, 1983

[54] POWER BOAT WITH EXTENDED PROPELLER POCKET

[76] Inventor: James R. Wynne, 261 SW. 6th St., Miami, Fla. 33130

[21] Appl. No.: 287,270

[22] Filed: Jul. 27, 1981

Related U.S. Application Data

[63] Continuation of Ser. No. 23,145, Mar. 23, 1979, abandoned.

[51] Int. Cl.³ .............................................. B63H 5/16
[52] U.S. Cl. ...................................... 440/69; 114/56; 114/343
[58] Field of Search .................. 114/56, 57, 62, 71, 114/162, 343, 77 R; 440/66, 69, 70

[56] References Cited

U.S. PATENT DOCUMENTS

| | | | |
|---|---|---|---|
| 608,757 | 8/1898 | Culbertson | 9/1.1 |
| 1,007,583 | 10/1911 | Loetzer | 114/57 |
| 2,134,042 | 10/1938 | Hoffman | 440/69 |
| 2,268,425 | 12/1941 | Scott-Paine | 9/1.1 |
| 2,710,587 | 6/1955 | Kutcher | 114/57 |
| 2,977,607 | 4/1961 | Roblee | 114/62 |
| 3,039,417 | 6/1962 | Hoffberg | 114/71 |
| 3,742,895 | 7/1973 | Horiuchi | 440/66 |
| 4,000,712 | 1/1977 | Erikson | 114/77 R |
| 4,031,846 | 6/1977 | Tone | 440/66 |
| 4,057,027 | 11/1977 | Foster | 440/69 |

FOREIGN PATENT DOCUMENTS 967 of 1897 United Kingdom .
930558 7/1963 United Kingdom .

Primary Examiner—Sherman D. Basinger
Attorney, Agent, or Firm—Arthur G. Yeager

[57] ABSTRACT

A boat includes a transom with an inboard engine disposed closely adjacently forward of the transom, a straight propeller shaft extends rearwardly and downwardly from such engine into a propeller pocket or tunnel extending from a smooth entrance end with respect to the bottom adjacent the transom, the shaft carrying a screw propeller disposed aft of the transom. The propeller pocket terminates rearwardly aft of the propeller and the transom. The tunnel and propeller are completely submerged below the at-rest waterline and the aft extension of the tunnel connects with aft extensions of the bottom to form a bottom extension generally the full width of the boat adjacent the transom. This bottom extension increases the lift of the boat if the tunnel does not interrupt the bottom, and if the tunnel does interrupt the bottom, the bottom extension compensates for the reduction of lift caused by the tunnel portion in the bottom, and a diving platform also extends across such full width above such bottom extension.

9 Claims, 6 Drawing Figures

POWER BOAT WITH EXTENDED PROPELLER POCKET

This is a continuation of application Ser. No. 23,145, filed Mar. 23, 1979, now abandoned.

BACKGROUND OF THE INVENTION

While various features of the invention are applicable to vessels of various sizes adapted for various uses, military, commercial and pleasure, the invention will be described as specifically exemplified in a 48 foot, twin diesel engine, cruiser yacht capable of planing speeds. Typical prior art yachts of this size are powered with twin diesel engines located near the longitudinal center of the hull. The space above the engines is almost always utilized for the salon or living room area, which sometimes includes the galley. There is usually an owners cabin or a stateroom located aft of the engines and one or two guest staterooms forward. The floor level of the salon is relatively high due to the space required by diesels of appropriate 250–450 horsepower size. This in turn requires that the control station for operating the boat be located aft of the salon, which generally results in poor forward visibility, or on a flybridge above the salon. Due to the relatively high location of such a flybridge over the salon, it is not usually feasible to fully enclose this for weather protection because the height of the boat and the extra topside weight would be excessive. Hence two control stations are generally provided; an open one above and an enclosed one below. In order to keep the overall height down as much as possible, the salon floor is as close as possible to the top of the engines. This makes access to the engines and other machinery located in this area, such as AC generating plant, air conditioning compressors, hot water heater, pumps, and the like, very difficult for routine maintenance or overhaul. Any major work requires opening large hatches in the salon floor which disrupts and dirties the living area. In normal operation, all of the noise, fumes, heat and vibration of this machinery are located a few inches below the feet of the occupants of the salon. In addition, the heavy weight of these diesel engines usually requires that other major weight, such as fuel and water, be placed aft, such as under the bunks and cabinets. The variation of the weights of the fuel and water in the tanks as the liquids are consumed causes frequent problems with the trim angle of the boat. It has been suggested that a better arrangement is to place the fixed engine weight well aft and the variable fuel weight forward near the middle of the boat where its change has less effect on the trim angle. In addition, if there is an open cockpit at the stern with the engines under this floor, the noise and heat are moved away from the primary living area and hatches can be provided in the cockpit floor for easy access. This arrangement has been tried occasionally using vee drive gear boxes. With these, the engine is mounted as far as possible to the stern with the output shaft pointing forward; a special gear box then turns the power train in a "V" to connect the engine to the propeller shaft and propeller extending aft. While this is satisfactory in theory, the cost, weight and mechanical complexity of vee drive gear boxes for large, high-torque diesel engines causes problems and such arrangements have never become popular. In addition, this moves the engine weight so far aft that some of the machinery must be located forward to compensate. Hence the AC generating plant has usually been placed under the salon in these arrangements, defeating much of the original objectives.

It has been known to provide partial propeller tunnels in order to locate engines somewhat further aft than usual, as, for example, in Hatteras 31, SeaCraft 23 and Phoenix 29 gasoline engine cruisers, and tunnels have also been employed to provide for shallow draft operation for small boats, as shown in U.S. Pat. Nos. 3,515,087 and 3,611,973, for example.

OBJECTS OF THE INVENTION

A general object of the invention is to improve the performance and space arrangements of power boats.

A specific object of the invention is to provide improved means for permitting inboard engines to be placed adjacent the transom in power boats. A further object is to provide an extended propeller pocket for compensating for loss of lift from a tunnel extending forwardly of the transom in a power boat.

Another specific object is to provide a main compartment in a boat hull generally longitudinally centrally of the hull which is low and disposed over liquid tanks subject to change in weight, a weather protected control station above said main compartment, and heavy engines aft of such main compartment. A still further object is, in a power boat, to provide enclosed occupiable space remote from the engine or engines, to improve engine access, and to locate variable weight liquid tanks generally longitudinally centrally of the hull thereby to minimize effects on trim of variations in the weights thereof.

The novel features which are believed to be characteristic of this invention are set forth with particularity in the appended claims.

The invention itself, however, both as to its organization and method of operation, together with further objects and advantages thereof, may best be understood by reference to the following description taken in connection with the accompanying drawing(s), in which.

Figure 1:
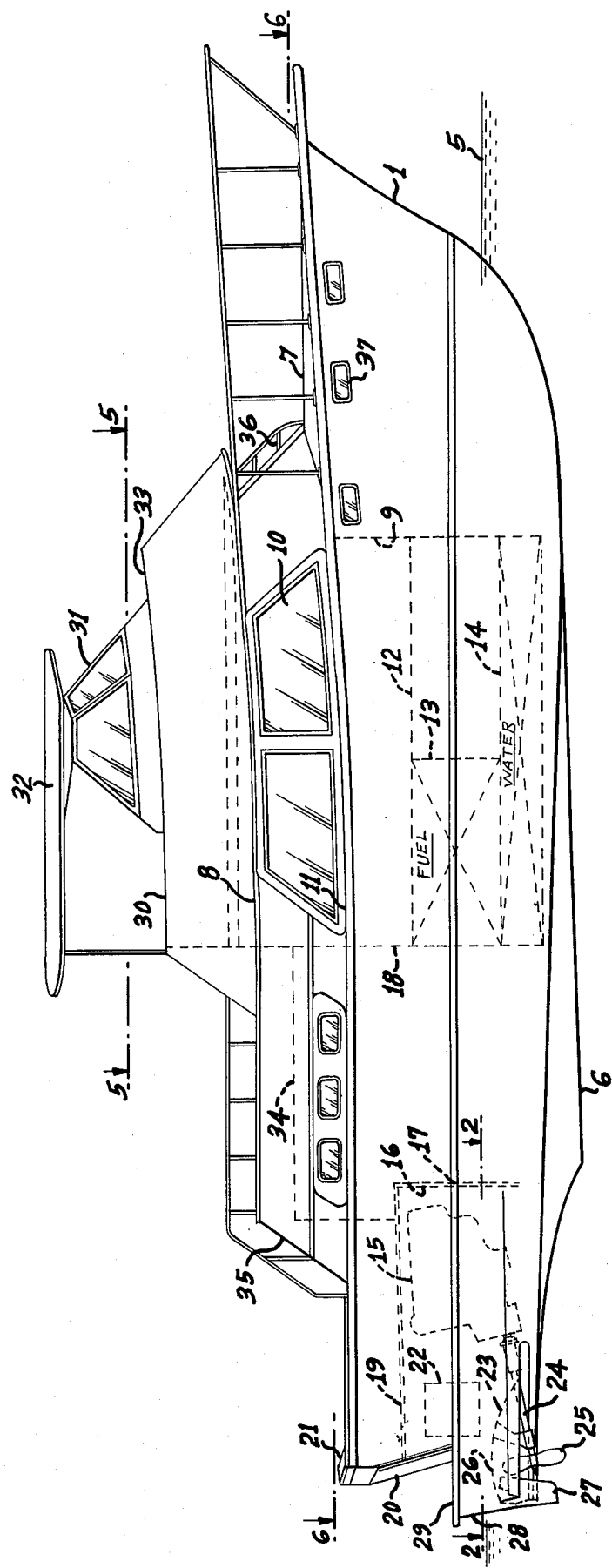
FIG. 1 is a side elevational view of a 48 foot yacht in accord with the invention.
Figure 5:
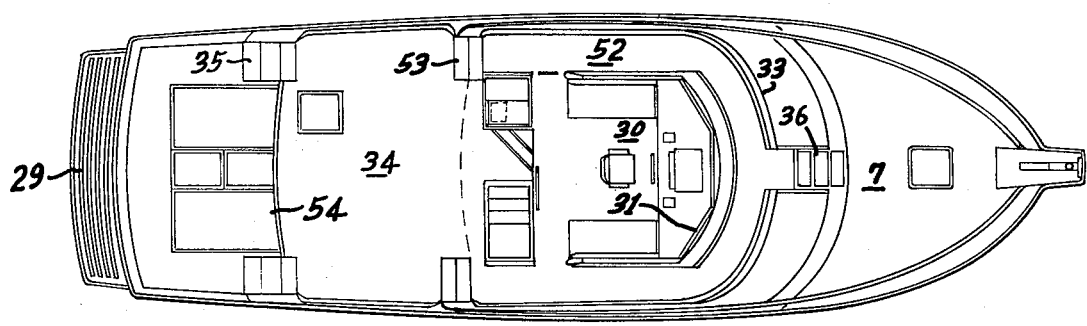
Figure 6:
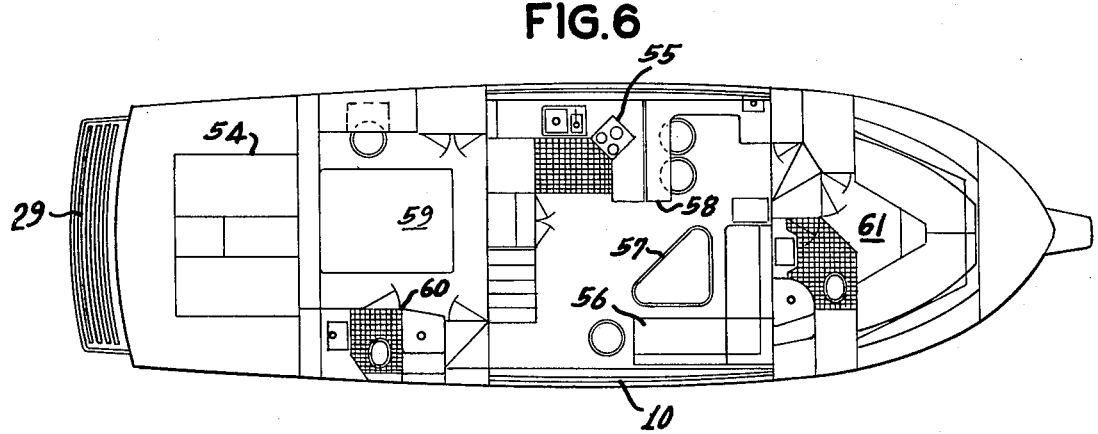

FIG. 5 is a sectional view taken along line 5—5 of, and on a scale reduced from the scale of, FIG. 1; and FIG. 6 is a similar view taken along line 6—6 of FIG. 1, Referring now to FIG. 1 of the drawings, the yacht embodying the invention comprises a V bottom hull 1 which may have generally parallel buttock lines and an approximate 12 degree deadrise at the stern. The at rest waterline may be as shown at 5, while the keel is seen at 6.

The hull is closed by a forward weather deck section 7 and by an intermediate weather deck section 8 overlying a main salon, indicated in broken lines at 9 and provided with side windows 10 which are disposed inwardly from the sides of the hull by only the width of the rail 11. The sole 12 of the salon, shown in broken lines, is low in the hull, but space is available thereunder for one or more fuel tanks and one or more water tanks represented generally in broken lines at 13 and 14 respectively.

As further shown in broken lines, two diesel engines, such as engine 15, are arranged in an engine room or compartment 16 which extends rearwardly from a bulkhead 17, which divides the engine room from an after owners cabin 18, the engine compartment being defined under a cockpit sole 19. The transom 20 constitutes the rear wall of the engine compartment and of the open cockpit 21. The engine compartment houses an a. c. generator, represented generally at 22, and preferrably, any other noisy auxiliary apparatus, such as an air conditioning compressor. The locating of the engines and such noisy equipment in the aft compartment well away from the main salon is made possible, with direct drive engines, by the providing of propeller pockets or tunnels, such as tunnel 23. The bulkhead 17 is desirably designed to provide sound insulation as well as structural integrity.

The engines are located adjacently forward of the transom and, with a reasonable propeller shaft angle of 10 to 15 degrees with respect to the at rest waterline, the propeller shafts, such as shaft 24, enter their respective tunnels at a point forward of the transom and carry propellers, such as propeller 25, in the tunnel or propeller pocket extension portions 26 spacedly aft of the transom. A rudder 27 is disposed in the pocket extension portion 26 aft of each propeller.

While ventilation of propellers positioned aft of a transom is frequently a troublesome problem, particularly when the propeller tips are proximate to the water surface, the provision of the propeller pockets minimizes such problems. It will be apparent that, with engines adjacent the transom with direct drive to the propellers, placement of the propellers deep in the water cannot be accomplished with acceptable propeller shaft angles.

The upper surface of the rearward extension structure 28, which is molded as a part of the fiberglass hull, and which includes the pocket extension portions 26, is conveniently provided with a teak grate 29 to serve as a swim platform.

The upper intermediate weather deck portion 8 defines the overhead of the salon 9 and serves as the deck for a weather-protected flying bridge control station 30, protection being afforded by windshields 31, a roof 32, and front and side bulwarks, 33. In that the deck portion 8 is only a short distance above the forward deck portion 7 and relatively low for a flying bridge, it can be weather protected and no interior control station is required. Access to the bridge deck 8 from the deck portion 34 above the owners cabin is by a step or two and access to deck portion 34 from the cockpit is afforded by a ladder 35. Three steps 36 are provided for access to deck portion 8 from the foredeck.

Ports 37 are provided for a forward cabin in the hull.

Figure 2:
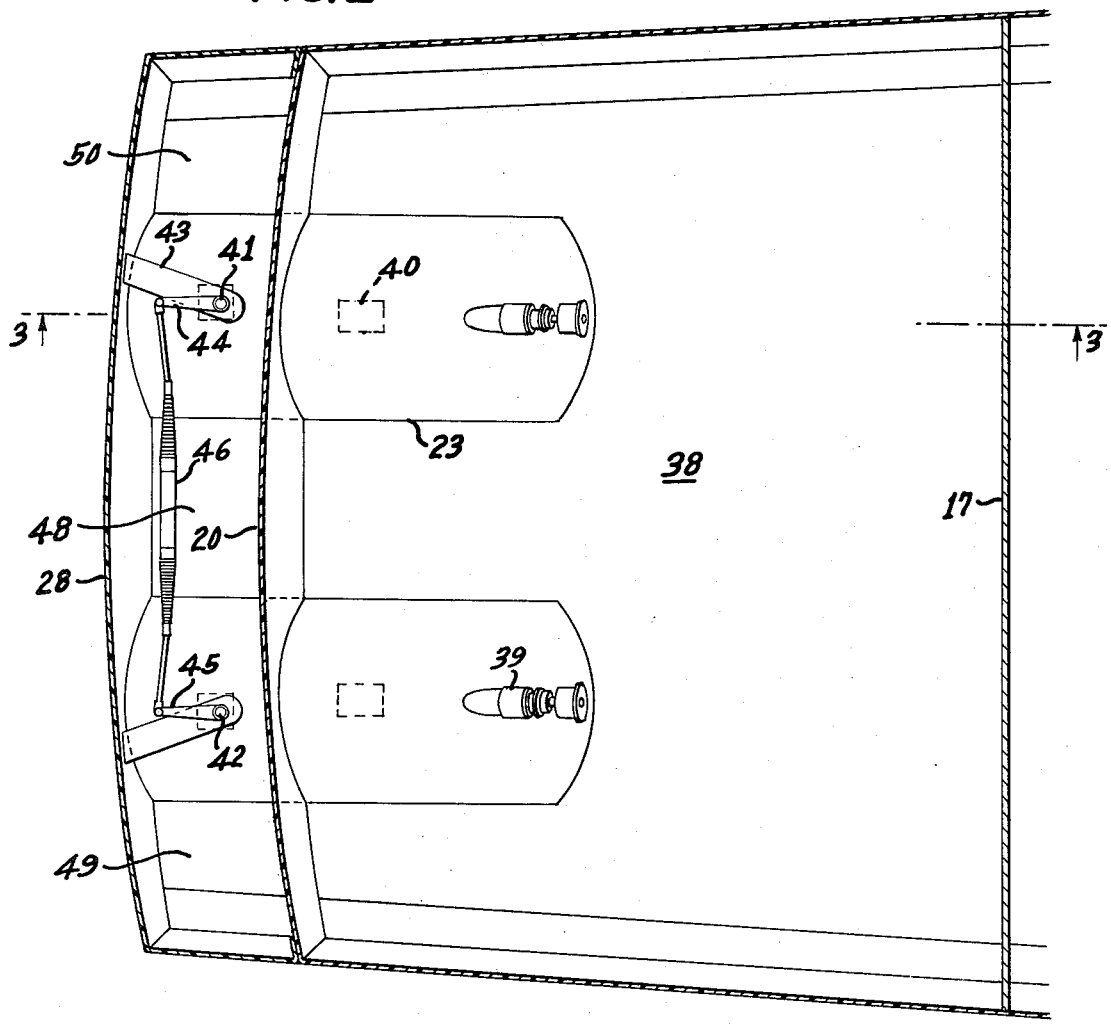
FIG. 2 is a sectional view of a portion of the yacht on an enlarged scale taken along line 2—2 of FIG. 1, the engines being omitted for clarity.
Figure 3:
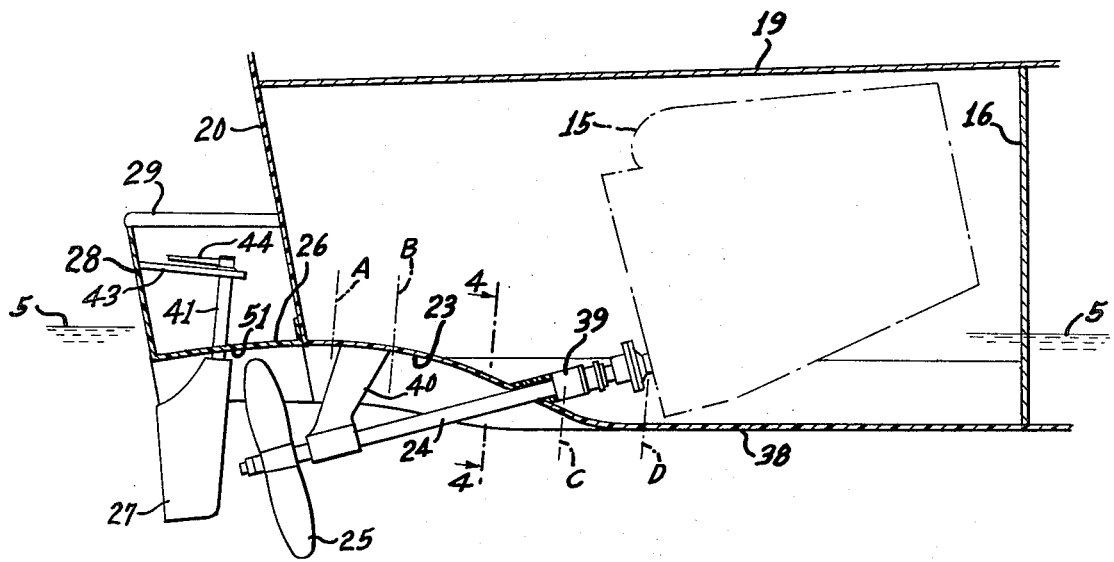
FIG. 3 is a sectional view taken along line 3—3 of FIG. 2, an engine being represented in phantom.

As seen in FIGS. 2 and 3, the propeller pockets or tunnels 23 rise from the bottom 38 of the hull and extend rearwardly to the transom 20, with stuffing boxes, such as seen at 39, for the propeller shafts, such as shaft 24. A strut 40 is provided for each shaft and each shaft carries a suitable propeller 25 disposed in the extension portions 26 of the propeller pockets 23 aft of the transom. A rudder 27 is provided rearwardly of each screw propeller 25, and the rudder posts 41 and 42 are appropriately steadied by braces, such as brace 43, and their steering arms 44 and 45 are interconnected by a link 46.

Figure 4:
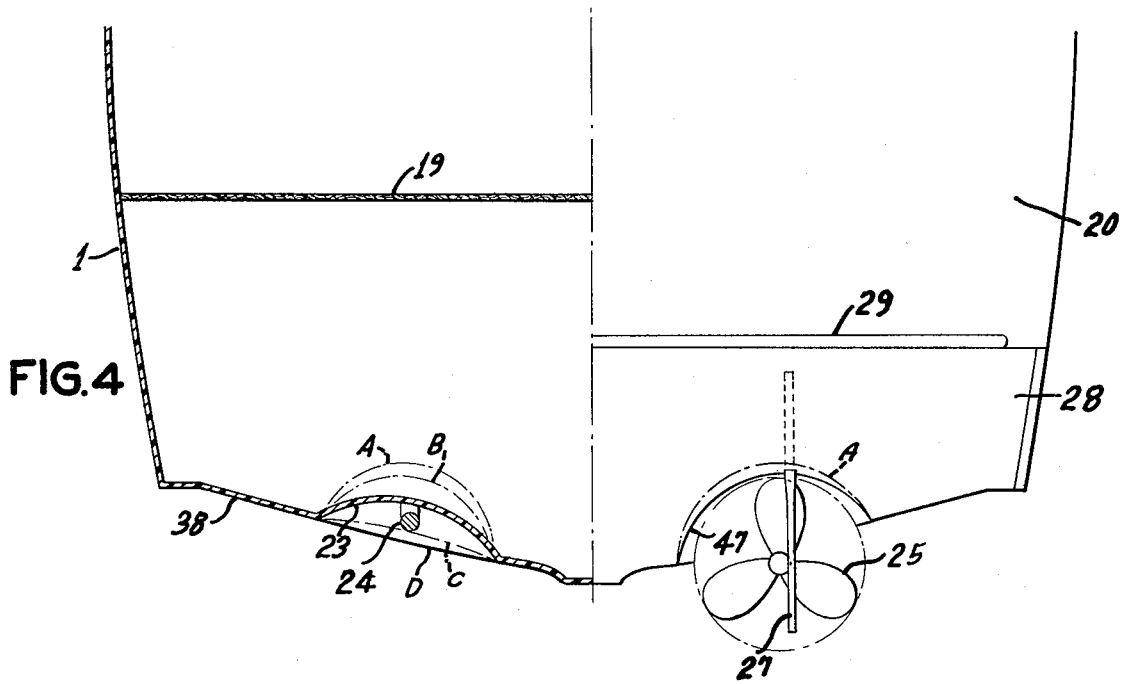
FIG. 4 is a fragmentary elevational view of the stern of the yacht, shown partially broken away and in section.

Each of the twin propellers is disposed in a pocket which is identical to that for the other. The configuration of a pocket 23, 26 is best seen with reference to FIGS. 3 and 4. FIG. 4 is, to the left of the centerline, a sectional view taken along line 4—4 of FIG. 3 and, to the right of the centerline, is an elevational view of the stern of the vessel. The fiberglass hull 1 as seen to the left in FIG. 4 includes hull bottom 38 formed to have an arcuate shape as seen at 23 at line 4—4 of FIG. 3, and superimposed broken lines A, B, C and D show the shapes of the pocket at stations A, B, C and D, respectively, indicated in FIG. 3.

In stern elevation, to the right of the centerline in FIG. 4, the edge 47 defining the aftermost or outflow end of the propeller pocket is indicated in solid lines, and, for comparison, the broken line at A shows the cross-sectional shape of the tunnel at its maximum upward penetration into the bottom, at station A as shown in FIG. 3.

It will be seen that the propeller pocket extends longitudinally for at least about 2½ propeller diameters, and that the maximum penetration, the top of the tunnel is more than two-thirds of and is preferably substantially equal to the radius of the propeller above the fair shape of the bottom without pockets. The pockets or tunnels, accordingly, substantially reduce the lift adjacent the stern and this loss is compensated for according to the invention, first by extending the bottom aft of the transom by means of the extension structure 28, both at 48 between the tunnels, and at 49 and 50 outboard the starboard and port tunnels, respectively, and, secondly, by a slightly downwardly inclined or gentle hook portion 51 of each tunnel extending aft of the propeller. The hook angle, the lengths and breadths of the bottom extension and portions 48, 49 and 50, the sizes and shapes of the tunnels, the positions and weights of the engine or engines, and the propeller shaft angles are interdependent, and it may be found that very little or no downward hook 51 will be required. With the small hook as shown, with an extension structure 28 extending two feet aft of transom 20 for a forty-eight foot boat, a planning speed angle of 3.5 degrees is maintained substantially constant from speeds just sufficient for full plane to maximum speed of about 23–24 knots. The boat goes over a small hump as speed increases from displacement hull speed of about 9 knots to planing speed.

The convenient and efficient equipment, facilities and living features made possible by the arrangement are best explained in connection with FIGS. 5 and 6, taken in conjunction with FIG. 1. The upper deck 52 between the bulwarks 33 and the windshield and roof-protected control station 30 is readily accessible to the foredeck by two steps 36 and to the deck 34 above the owners cabin by two pairs of steps, such as the pair 53, while three further steps are provided from that deck to the cockpit sole 19. The cockpit sole is provided with a hatch 54 affording access to the engine room. The interior includes a main salon with galley 55, lounge 56, table 57 and bar 58. The owners cabin forward of the engine room and accessible to the salon includes a bed 59, head 60, and suitable closets and the like, while a V-berth stateroom 61 is provided in the bow area under the foredeck 7.

Thus the engine room is accessible to the outside of the boat, so that a crane may have direct lifting access to an engine, for example, and is disposed in the stern and aft of all passenger areas. The salon is sufficiently low to permit an all-weather control station thereabove. Variable weight liquid tanks are approximately midway between bow and stern so to have minimal effect on trim.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. In a power boat having a hull with a bottom and a stern transom, a first tunnel portion in said bottom extending rearwardly from a forward end forwardly of said transom, tunnel extension means extending rearwardly from said transom and defining a tunnel extension portion continuous with said first tunnel portion, said first tunnel portion and said tunnel extension portion being below the at-rest waterline of the boat, a screw propeller disposed in said extension portion and being completely submerged when said boat is at-rest, an engine disposed in said hull closely adjacently forward of said transom, and a short straight propeller shaft at an acute angle with respect to said waterline carrying said propeller and drivingly connected to said engine, said tunnel extension means including extension portions on both sides of said tunnel portion in the same general plane as said bottom adjacent said transom, said extension portion and said tunnel extension means extending generally the full width of said boat adjacent said transom whereby the lift adjacent said stern is increased to compensate for the reduction of lift caused by said first tunnel portion in said bottom.

2. The combination according to claim 1 wherein said tunnel has a roof which is submerged below said waterline and is upwardly inclined with respect to said waterline at its said forward end and gradually curves to be substantially parallel to said waterline above said propeller and rearwardly of said propeller to have a downwardly inclined portion.

3. The combination according to claim 1 wherein said extension means carries a rudder therebelow disposed rearwardly of said propeller, said extension means carrying a generally horizontal platform extending rearwardly from said transom for diving therefrom when the boat is unpowered and extending substantially the width of said boat adjacent said transom.

4. In a power boat having a hull with a bottom and a stern transom, bottom extension means extending generally the full width of said bottom adjacent said stern transom and rearwardly from said transom and defining an extension of said bottom continuous with said hull bottom and a tunnel interrupting said bottom extension, a screw propeller disposed in said tunnel, an engine disposed in said hull closely adjacently forward of said transom, a short straight propeller shaft drivingly connected to said engine extending therefrom at an acute angle with respect to the at-rest waterline into said tunnel and carrying said propeller solely therein, said tunnel and said propeller shaft and propeller being below said waterline of the boat, said tunnel extending forwardly into said bottom, said bottom extension means providing increased lift to compensate for the reduction of lift caused by said tunnel extending into said bottom.

5. The combination according to claim 4 wherein said tunnel has a rearward end and a roof which is submerged below said waterline and has a portion forward of said rearward end which is substantially parallel to said waterline above said propeller and which gradually inclines downwardly rearwardly of said propeller.

6. The combination according to claim 5 wherein said tunnel includes a forward end interupting said bottom forwardly of said transom, said forward tunnel end tapering substantially smoothly downwardly and at a small acute angle of intersection with said bottom, as measured upwardly from the general plane of said bottom.

7. In a power boat having a hull with a bottom and a stern transom, bottom extension means affixed to said transom extending the full width of said bottom adjacent said stern transom and rearwardly from said transom and defining a smooth bottom extension continuous with said hull bottom, said bottom extension means having a continuous tunnel interrupting said bottom extension, said tunnel having a rearward end and a roof all submerged below the at-rest waterline, said tunnel further having a portion forward of said rearward end which is substantially parallel to said at-rest waterline above said propeller and which gradually declines downwardly rearwardly of said propeller and terminates in said rearward end, said tunnel being continuous and uninterrupted throughout said bottom extension means, a screw propeller disposed in said tunnel, an engine disposed in said hull closely adjacently forward of said transom, and a short straight propeller shaft drivingly connected to said engine extending therefrom at an acute angle with respect to said at-rest waterline into said tunnel and carrying said propeller solely therein, said tunnel and said propeller shaft and propeller being below said waterline of the boat, said bottom extension providing increase lift to said boat.

8. The combination according to claim 7 wherein said tunnel includes a forward end interrupting said bottom forwardly of said transom, said forward tunnel end tapering substantially smoothly downwardly and at a small acute angle of intersection with said bottom, as measured upwardly from the general plane of said bottom.

9. In a power boat having a hull with a bottom and a stern transom, bottom extension means extending generally the full width of said bottom adjacent said stern transom and rearwardly from said transom and defining an extension of said bottom continuous with said hull bottom and a tunnel interrupting said bottom extension, a screw propeller disposed in said tunnel, an engine disposed in said hull closely adjacently forward of said transom, and a short straight propeller shaft drivingly connected to said engine extending therefrom at an acute angle with respect to the at-rest waterline into said tunnel and carrying said propeller solely therein, said tunnel and said propeller shaft and propeller being below said waterline of the boat, said bottom extension means providing increase lift to said boat, said tunnel including a forward end portion extending forwardly of said transom, said bottom extension means compensating for the reduction of lift caused by said tunnel forward end portion in said bottom.

* * * * *